United States Patent [19]

Mese et al.

[11] 4,064,484
[45] Dec. 20, 1977

[54] ANALOG-DIGITAL CONVERTER WITH VARIABLE THRESHOLD LEVELS

[75] Inventors: Michihiro Mese; Takafumi Miyatake, both of Hachioji; Seiji Kashioka, Kokubunji; Toshimitsu Hamada, Tokyo, all of Japan

[73] Assignee: Hitachi, Ltd., Japan

[21] Appl. No.: 708,633

[22] Filed: July 26, 1976

[30] Foreign Application Priority Data

Aug. 1, 1975 Japan .................................. 50-93095

[51] Int. Cl.$^2$ ............................................. G06K 9/00
[52] U.S. Cl. .................. 340/146.3 AG; 340/347 AD; 358/169
[58] Field of Search ............. 340/146.3 AG, 347 AD; 358/169, 105, 161, 163, 168

[56] References Cited

U.S. PATENT DOCUMENTS

| | | | |
|---|---|---|---|
| 3,484,747 | 12/1969 | Nunley | 340/146.3 AG |
| 3,701,099 | 10/1972 | Hall et al. | 340/146.3 AG |
| 3,737,854 | 6/1973 | Klemt | 340/146.3 AG |
| 3,737,855 | 6/1973 | Cutala | 340/146.3 AG |
| 3,747,066 | 7/1973 | Vernot et al. | 340/146.3 AG |
| 3,778,768 | 12/1973 | Brisk et al. | 340/146.3 AG |
| 3,911,212 | 10/1975 | Yoshizawa et al. | 340/146.3 AG |

Primary Examiner—Leo H. Boudreau
Attorney, Agent, or Firm—Craig & Antonelli

[57] ABSTRACT

An analog-digital converter comprises a comparator to which signals to be converted are applied, and a threshold circuit coupled with the comparator in order to control the threshold level of the comparator, so that the signals applied to the comparator are converted into binary signals based upon a predetermined threshold level. The threshold level corresponding to the output of the threshold circuit is compensated in accordance with the variations in the levels of the signals applied to the comparator. The threshold level of the comparator is changed to a compensated level when the result, calculated from the average level of the signals approximately corresponding to a predetermined area in a field of the object and that of the signals approximately corresponding to plural areas which are in the vicinity of the predetermined area, is different from that of the preceding frame.

10 Claims, 9 Drawing Figures

TO GATE CIRCUIT 142

ANALOG-DIGITAL CONVERTER WITH VARIABLE THRESHOLD LEVELS

BACKGROUND OF THE INVENTION

This invention relates to an analog-digital converter for converting analog signals into digital signals, and more particularly, to an analog-digital converter in which the threshold level for converting the analog signals, such as image signals, into binary signals is changed in response to changes in the level of the analog signals.

In the field of pattern recognition, image signals from an image pick-up device, such as an industrial TV camera, are converted into binary signals based on a constant threshold level.

In this case, no binary signals with long-term stability have been obtained since the gains and the DC levels of the image signals vary at relatively slow speeds due to variations in temperature and brightness under various conditions.

SUMMARY OF THE INVENTION

An object of this invention is to provide an analog-digital converter, the threshold level of which is adjusted in response to variations in the gains and the DC levels of the image signals.

Another object of this invention is to provide an analog-digital converter capable of operating with high stability for long periods of time.

In order to achieve the above objects, the analog-digital converter of this invention comprises a comparator for comparing signals to be converted with a threshold level for obtaining digital signals, and a threshold level control circuit coupled with the comparator, for controlling the threshold level thereof. The threshold level of the comparator is compensated in response to variations in the levels of the signals applied to the comparator.

Further, the improved analog-digital converter of this invention is so designed that the threshold level of the comparator is compensated in response to variations in the levels of the signals to be converted, with the exception of abnormal signals, such as noise signals, which are automatically disregarded.

The above and other objects and advantates of this invention will be understood from the following detailed description of a preferred embodiment with reference to the following drawings.

DESCRIPTION OF THE PREFERRED EMBODIMENT

The principle of this invention will be explained with reference to FIG. 1. The image sample is illustrated as a simple model or object 1 divided into a plurality of picture elements in a 16 by 24 coordinate arrangement of picture elements located with reference to axes in the vertical and horizontal directions, respectively. Further, the brightness of each picture element is to be represented by binary levels, i.e., the level "1" for a bright element and the level "0" for a dark picture element, even though the actual brightness is generally multilevel. Therefore, in the sample model of FIG. 1, the hatched portion corresponds to the level "0" and the unhatched portions correspond to the level "1". X and Y represent the axes of the discrete image coordinate system.

A signal $S_1$ designates a video signal derived from an image pick-up device, such as an industrial TV camera, by which object 1 is picked up. The lower and higher levels of the signals $S_1$ designate the black and white portions of the object, respectively. It is assumed that the signal $S_1$ corresponding to one horizontal scanning period H of the image is obtained repeatedly every period as that part of the object along the dotted line 6 is scanned. Since the object is static in a pattern recognition system, the same data will be scanned along dotted line 6 of the object 1 during each period.

When the signal $S_1$ is converted into a binary signal with a threshold level $L_1$, the binary signal $S_3$ is obtained. However, if the threshold level of the signal $S_1$ changes to $L_2$, such as illustrated by the signal $S_2$, for a significant period of time, an incorrect binary signal $S_4$ is obtained if the signal $S_2$ is converted into a binary signal using the threshold level $L_1$. But, when the signal $S_2$ is converted into a binary signal based on threshold level $L_2$, which is compensated in response to the variation of signal $S_1$, the correct binary signal $S_3$ is obtained. In order to compensate the threshold level in accordance with this invention, the following principle is utilized.

Figure 1:
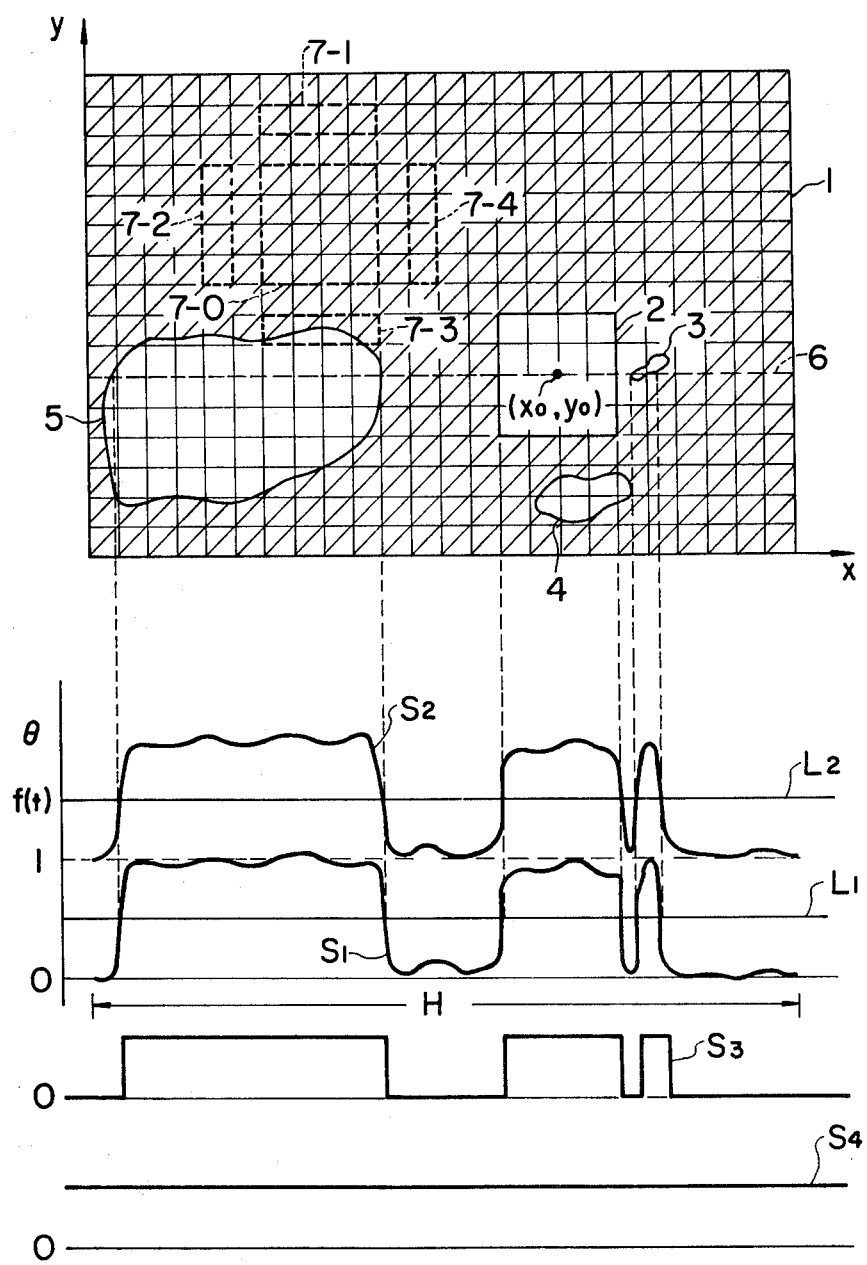
FIG. 1 is a diagram explaining the fundamental principle of this invention.

Generally, a specific pattern of regular geometric configuration, such as the pattern 2 in FIG. 1, occupies a constant area, and the brightness of the area is different from that of the background. Therefore, the specific pattern 2 can be easily recognized in contrast to the other bright parts of the pattern of object 1. In accordance with this invention, recognizing the above characteristics, the object 1 is scanned with a standard pattern 7 - 0, which is approximately the same size and shape as the specific pattern 2 to be identified, and standard patterns 7 - 1 through 7 - 4, which are always located on responsive sides of the standard pattern 7 - 0 in the vicinity thereof. Then, the specific pattern 2 is detected by searching for the maximum difference in brightness between the area scanned by the standard pattern 7 - 0 and that of the background in the vicinity thereof, as provided in the areas scanned by the standard patterns 7 - 1 through 7 - 4, and the threshold level is determined according to the results which are obtained by such comparison.

The compensated threshold level is obtained from the following equations, in which the function of the average brightness level of the standard pattern 7 - 0 and those of the standard patterns 7 - 1, 7 - 2, . . . are defined as $f_o(x,y), f_1(x,y), \ldots$ respectively in the discrete image coordinate system. The value of the difference $g(x,y)$ between the value of $f_o(x,y)$ and the sum of the values of $f_1(x,y), f_2(x,y),$ are defined by the following equation (1)

$$g(x,y) = \bar{f}_o(x,y) - \sum_{i=1}^{k} Ai \bar{f}_i(x,y) \qquad (1)$$

where $Ai$ $(i = 1,2,\ldots,k)$ is a constant value, which can be defined for the object, such as $Ai = 1$, relating to the weight for adjusting the value of $f_i(x,y)$ to emphasize the difference between the first and second term of equation (1), and $k$ is the number of the standard pattern proximate to the standard pattern 7 - 0, such as $k = 4$ in FIG. 1. The maximum value of $g(x,y)$ at coordinates $(x_o, y_o)$, is obtained when the standard pattern 7 - 0 coincides with the specific pattern 2, whereas it is not obtained when the standard pattern 7 - 0 coincides with another part of the object 1, such as region 5 in FIG. 1.

Accordingly, the compensated threshold level $\theta$ is shown by the following equation (2):

$$\theta = \beta \bar{f}_o(x_o,y_o) - (1 - \beta) \min_{i=1,2,\ldots k} \bar{f}_1(x_o,y_o) \qquad (2)$$

where $\beta$ $(0<\beta<1)$ is a constant value, which can be defined experimentally. As an example, $\beta = 0.5$, relating the weight for adjusting the value of $\theta$ in equation (2). The second term of equation (2) represents the minimum value for the average brightness levels of the standard patterns surrounding the standard pattern 7 - 0 which reduces the influence of noise levels, such as provided by noise patterns 3 or 4 in FIG. 1.

Figure 2:
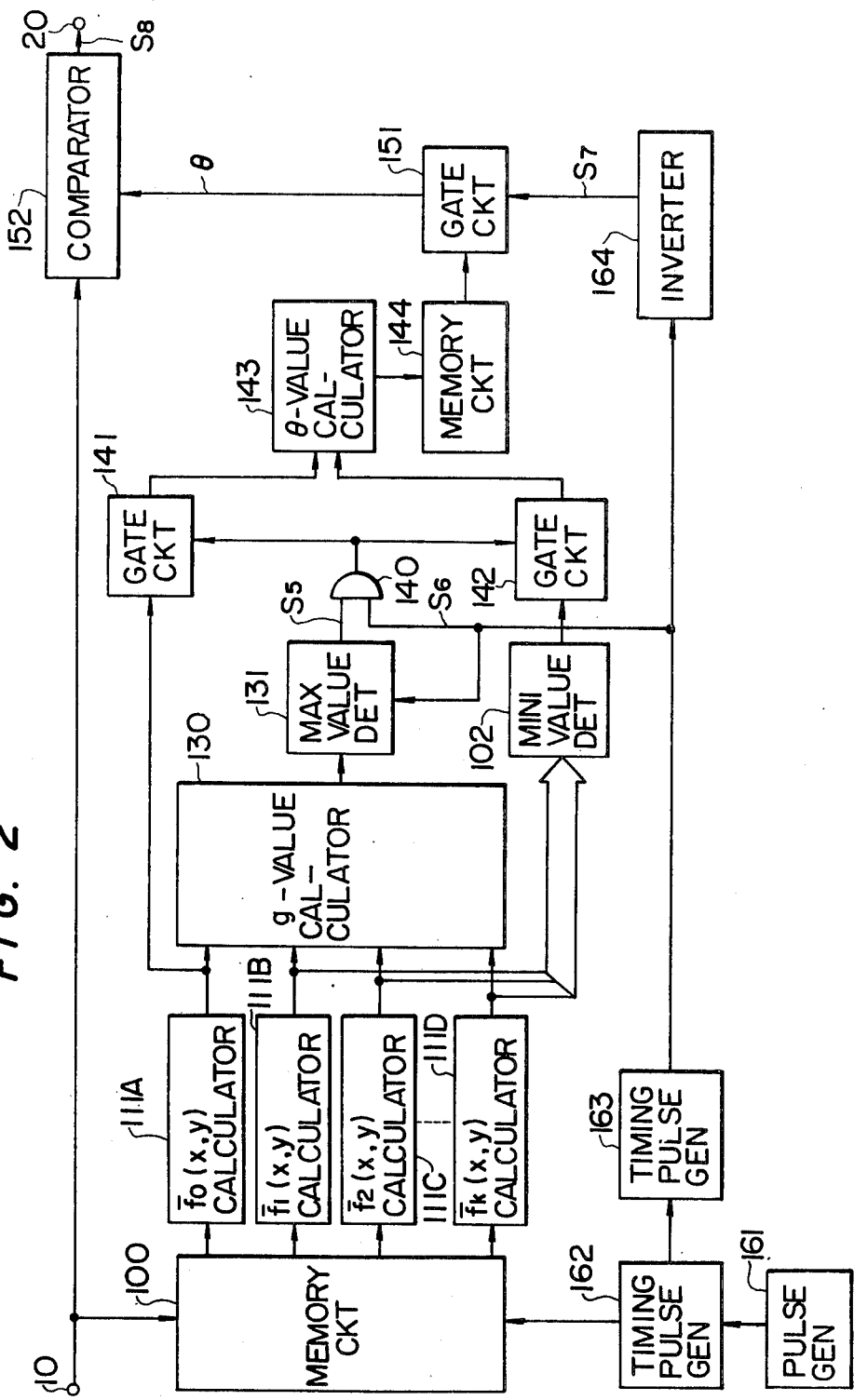
FIG. 2 is a schematic block diagram of an exemplary embodiment of this invention.
Figure 3:
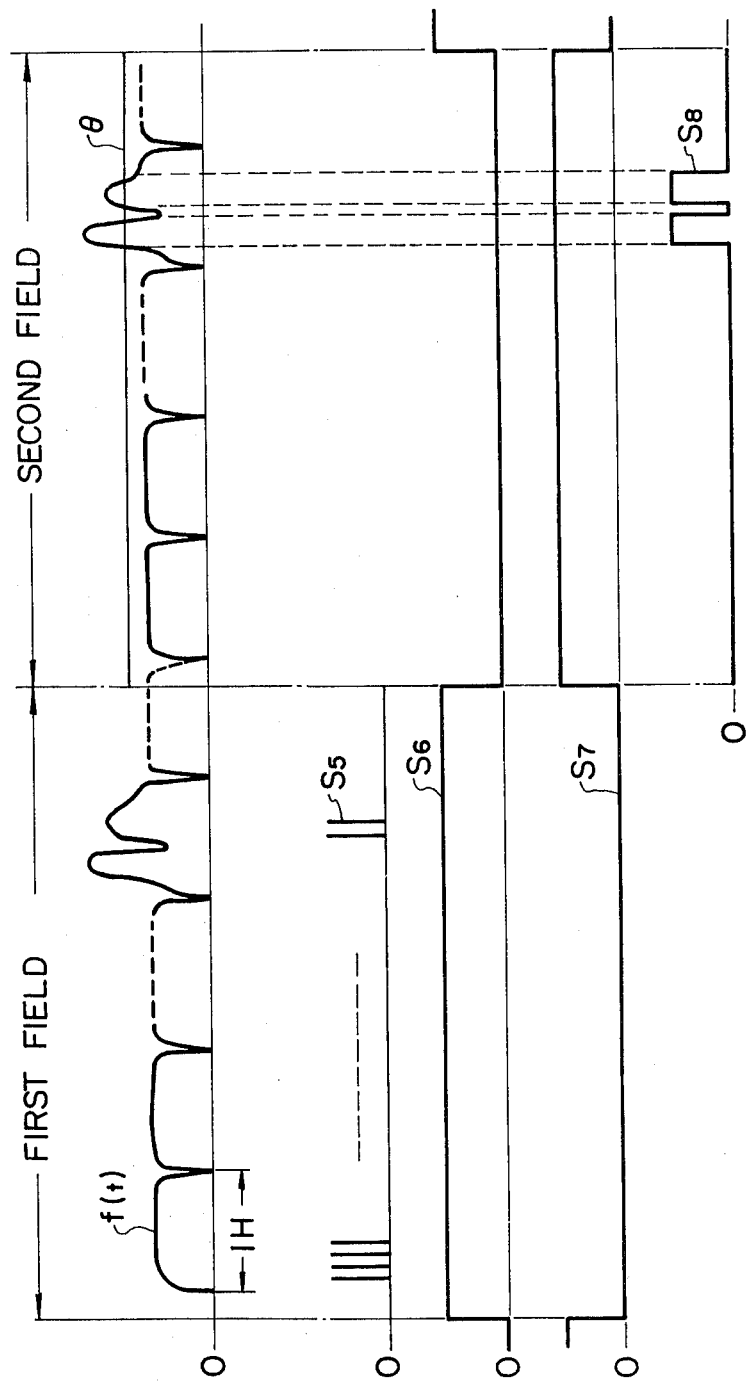
FIG. 3 is a waveform diagram in the form of a time chart explaining the system shown in FIG. 2.

Next, an exemplary embodiment of this invention will be explained in connection with FIG. 2 of the drawing. An embodiment of this invention is shown in FIG. 2 in which the video signal $f(t)$ from an industrial TV camera, for example, is applied to an input terminal 10. The video signal $f(t)$ and various other signals to be explained hereinafter are shown in FIG. 3. The video signal $f(t)$ is obtained repeatedly for the period of one field, and in this embodiment, the compensated threshold level $\theta$ calculated for the first field and the video signal $f(t)$ is converted in accordance with the compensated threshold $\theta$ in the second field.

The video signal $f(t)$ is supplied to comparator 152, and at the same time to a memory circuit 100. Memory circuit 100 stores the values of the video signal $f(t)$ sequentially, and the signals are shifted by timing pulses to be supplied from timing pulse generator 162 which is synchronized with pulse generator 161.

Figure 4:
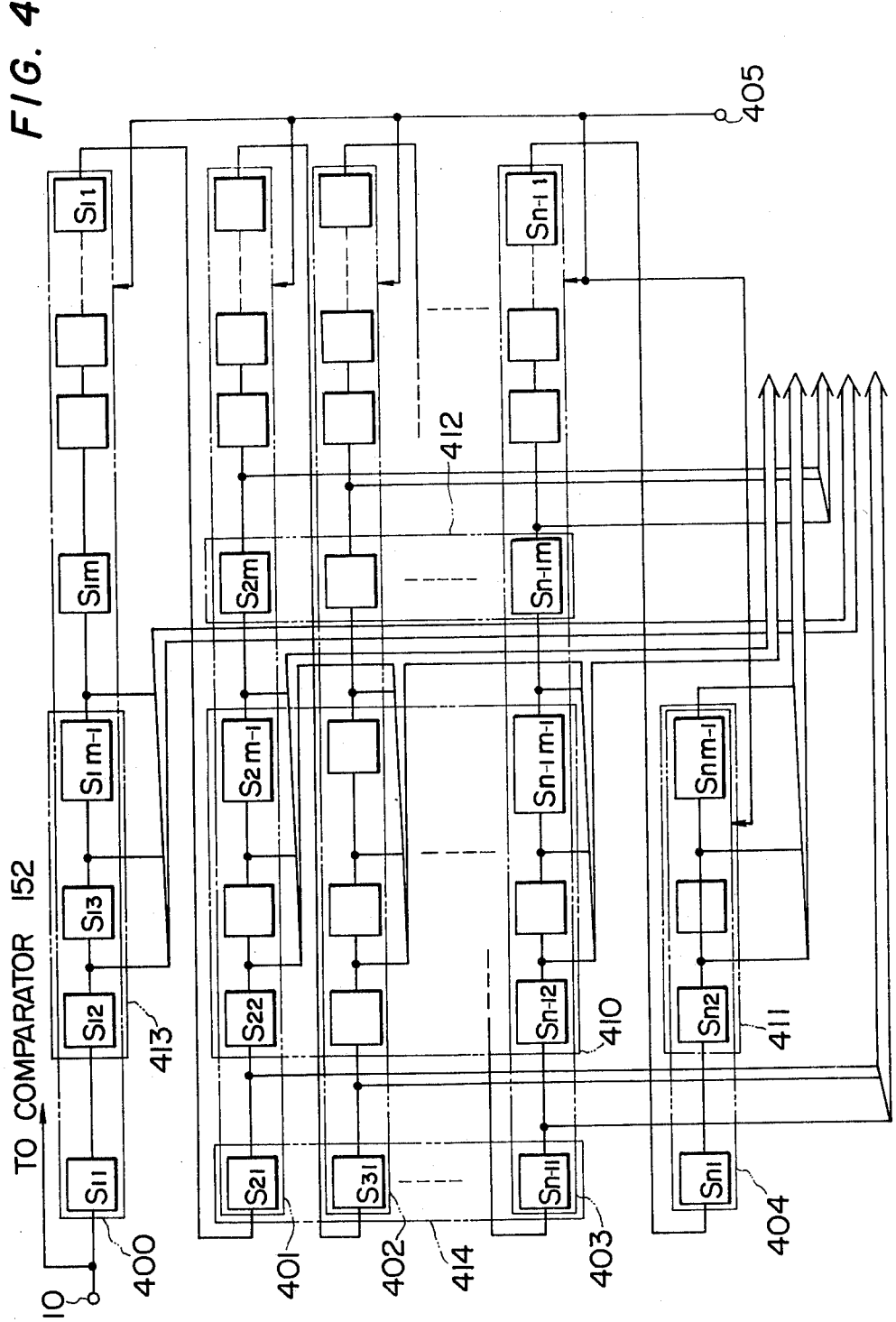
FIG. 4 is a schematic block diagram of the memory circuit portion of the system shown in FIG. 2.

The details of memory circuit 100 are shown in FIG. 4, in which memory circuit 100 comprises a plurality of serially connected shift registers 400 through 404, in each of which the signal is shifted by the timing pulses from timing pulse generator 162 applied through terminal 405. The shift registers 400 through 403 each comprise $l$ number of cells, such as a CCD having $l$ stages, for storing the analog signal, and the shift register 404 comprises $m-l$ number of cells, such as a CCD having $m-l$ stages, for storing the analog signal. The number of cells ($l$) in each register corresponds to the number of the picture elements in one horizontal scanning period.

The areas, which are surrounded by the dotted lines 410 through 414 in FIG. 4, designate the storage areas for standard patterns 7 - 0 through 7-4 in FIG. 1, respectively. Video signal $f(t)$ is first supplied to the first memory cell $S_{11}$ of the shift register 400, in which the image information corresponding to one picture element is temporarily stored. The content of memory cell $S_{11}$ is shifted to the next memory cell $S_{12}$ by the timing pulses supplied from terminal 405. Similarly, the video information, in turn, is shifted in the order of $S_{12} \rightarrow S_{13} \rightarrow \ldots$ $S_{1l} \rightarrow S_{21} \rightarrow \ldots$, $S_{nm-1}$ in response to the applied timing pulses, where $n$ and $m$ correspond to the number identification of the picture elements in the standard patterns 7 - 0 through 7 - 4, respectively.

The outputs of the grouped memory cells 410 through 414 are supplied to the $\bar{f}(x,y)$ calculators 111A through 111D in FIG. 2, respectively.

Figure 5:
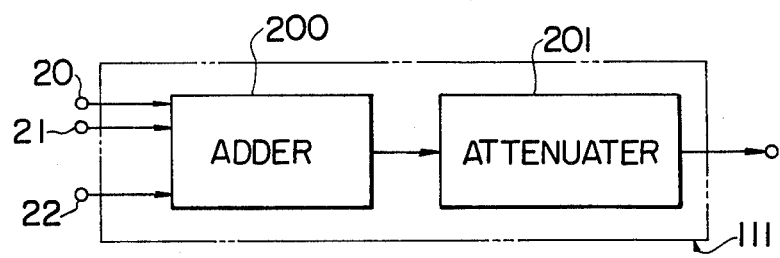
FIG. 5 is a schematic block diagram of the calculator portion of the system shown in FIG. 2.
Figure 6:
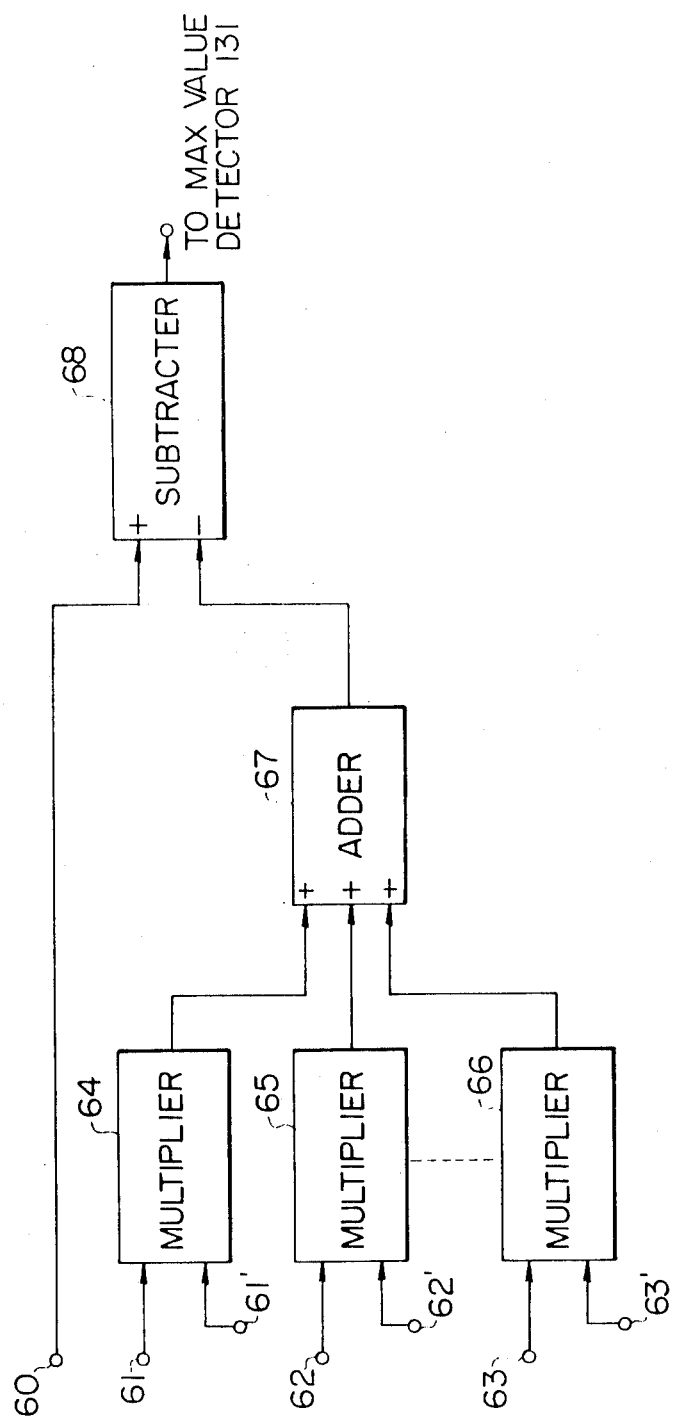
FIG. 6 is a schematic block diagram of the $g$ value calculator portion of the system shown in FIG. 2.

The calculators 111A through 111D are each comprised of an adder 200 and an attenuator 201, as shown in detail in FIG. 5. More particularly, the output signals from the memory cells of a respective group 410–414 of memory circuit 100 are supplied to the input terminals 20 through 22 of adder 200, in which the sum of the received signals is calculated. In attenuator 201 the output signal from adder 200 is attenuated to obtain the average value by a factor corresponding to the number of inputs to adder 200. The output signals of the calculators 111A through 111D are supplied to a $g$-value calculator 130, as shown in FIG. 6 in more detail.

Input terminals 60 through 63 of the $g$-value calculator 130 are connected to the output terminals of the calculators 111A through 111D, respectively. The input signals received on terminals 61 through 63 are multiplied by signals supplied to terminals 61' through 63', having the weight $Ai$, in multipliers 64 through 66, respectively. Then, the output signals of the multipliers 64 through 66 are applied to adder 67, which adds the applied signals.

Figure 7:
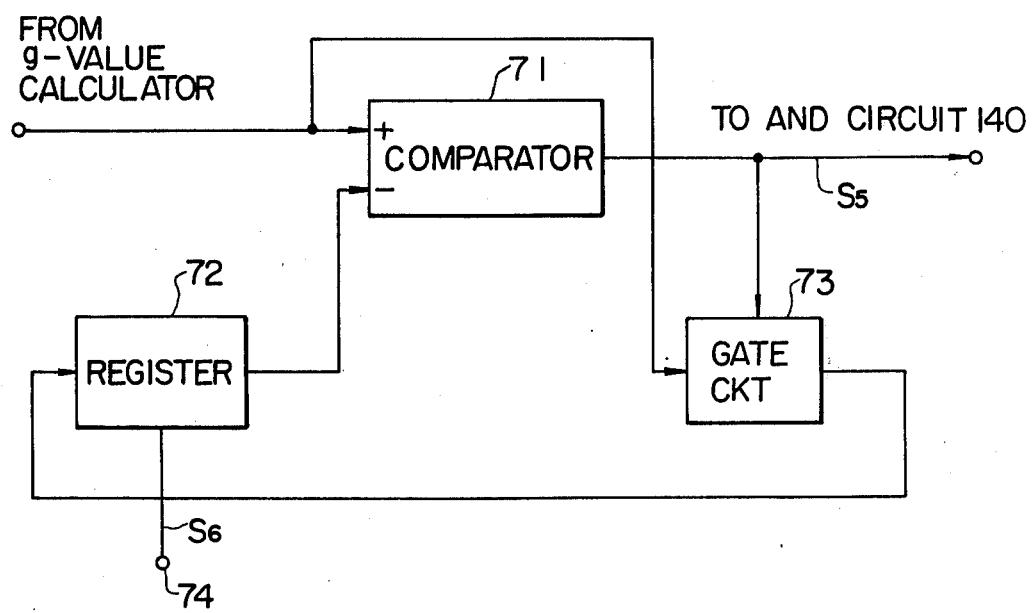
FIG. 7 is a schematic block diagram of the maximum value detector portion of the system shown in FIG. 2.

The output signal from adder 67 corresponds to the second term of equation (1). Thus, the value of $g(x,y)$ in equation (1) is obtained from a subtractor 68, in which the $\bar{f}_o(x,y)$ output signal supplied through terminal 60 and the output signal from adder 67 are received at the plus and minus input terminals thereof, respectively, to obtain the difference value. The output signal of the $g$-value calculator 130 is supplied to the maximum value detector 131, shown in detail in FIG. 7.

In the maximum value detector 131, the output signal from the $g$-value calculator 130 is applied to the plus terminal of comparator 71 and to the input of gate circuit 73. The output signal from the gate circuit 73 is applied to register 72, and the output signal of register 72 is applied to the minus input terminal of comparator 71, in which the respective input signals are compared. If the value of the signal from the $g$-value calculator is larger than that of the output signal of the register 72, a pulse signal $S_5$ is obtained from comparator 71, and the pulse signal $S_5$ is applied to the gate circuit 73 for gating the signal from the $g$-value calculator 130 to register 72, in which the maximum value of the $g$-value signal is always stored. Further, register 72 is driven by a timing pulse $S_6$, to be supplied from timing pulse generator 163.

Referring back to FIG. 2, the pulse signal $S_5$ and the timing pulse $S_6$ are applied to the input terminals of the AND circuit 140, respectively, and the output of the AND circuit 140 is supplied to gate circuits 141 and 142 at the same time. On the other hand, the output signal of the calculator 111A is supplied to gate circuit 141, in which the value $\bar{f}_o(x,y)$ is gated in response to the output signal of the AND circuit 140. Furthermore, the groups of output signals for each of the calculators 111B through 111D are applied to the minimum value detector 102, in which the minimum value for the group is detected. The minimum value detector 102 is shown in FIG. 8 in more detail.

Figure 8:
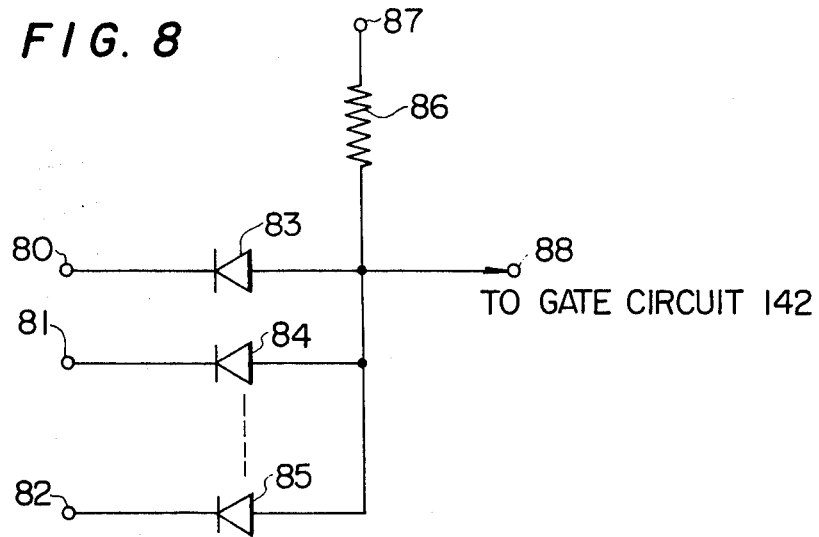
FIG. 8 is a schematic circuit diagram of the system shown in FIG. 2.

In FIG. 8 the anodes of diodes 83 through 85 are connected to each other to one end of register 86. The other end of resistor 86 is connected to terminal 87 to which is connected a DC power supply (not shown in FIG. 8). Diodes 83 through 85 are fully forward biased by the supplied voltage (such as 2V) from the DC power supply. Next, the output signals of the calculators 111B through 111D are supplied to terminals 80 to 82, respectively. Only the minimum output signal value of the calculators 111B through 111D can be obtained after passing through one of the diodes. The diode to which the minimum signal value of the calculators 111B through 111D is supplied, is forward-biased and the other diodes are reversely biased.

Figure 9:
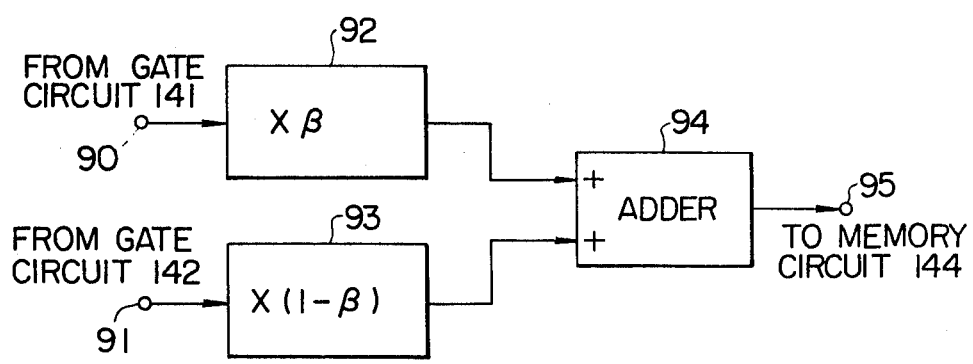
FIG. 9 is a schematic block diagram of the $\theta$ value calculator portion of the system shown in FIG. 2.

The minimum value of the signal derived from one of the calculators 111B through 111D is outputed from the minimum value detector 102 and the value is gated by gate circuit 142 in response to the output signal of the AND circuit 140 in FIG. 2. The gated signals, which are the maximum value of $\overline{f}_o(x,y)$ and the minimum value of $\overline{f}_1(x,y)$ through $\overline{f}_k(x,y)$, are supplied to a $\theta$ threshold value calculator 143, respectively. The $\theta$ value calculator 143 is shown in detail in FIG. 9.

In the value calculator 143, the maximum value of $\overline{f}_o(x,y)$ within one field is applied to terminal 90, and the minimum value of $\overline{f}_1(x,y)$ through $\overline{f}_k(x,y)$ is applied to terminal 91. The maximum value of $\overline{f}_o(x,y)$ is multiplied by the weight $\beta$, such as $\beta = 0.5$, in multiplier 92, and the signal received at terminal 91 is multiplied by the weight $(1 - \beta)$, such as 0.5, in multiplier 93. The values of the output signals of multipliers 92 and 93 correspond to the first and second terms of equation (2), respectively. Then, the output signals from multipliers 92 and 93 are applied to adder 94, in which the two received signals are added to each other. Therefore, the compensated threshold level $\theta$ is obtained from the output terminal 95 of adder 94. The compensated threshold level $\theta$ is supplied to memory circuit 144, in which the compensated threshold level $\theta$ is stored.

In this embodiment the above-mentioned operation is continued for the entire first field until the compensated threshold level $\theta$ resulting from a calculation of the maximum value of $\overline{f}_o(x,y)$ and the minimum value of $\overline{f}_1(x,y)$ through $\overline{f}_k(x,y)$ which correspond to a specific pattern 2 and the optionally chosen patterns surrounding the specific pattern in FIG. 1, is stored in memory circuit 144. The last output pulse in the first field is obtained from the AND circuit 140 when standard pattern 7 - 0 coincides with the specific pattern 2 in FIG. 1.

In the second field, the stored compensated threshold level $\theta$ is passed through gate circuit 151 in response to the timing pulse $S_7$ received from the inverter 164, in which the timing signal $S_6$ is inverted, as shown in FIG. 3. Comparator 152 compares the image signal $f(t)$ received at terminal 70 with the compensated threshold level $\theta$ throughout the second field, and the binary signal $S_8$ is obtained from output terminal 20 of comparator 152.

While the specific pattern chosen for the above embodiment is a square, any pattern shape can be applied to the present invention. Furthermore, this invention is applicable even when the bright and dark elements in the object are reversed, such as when the brightness level of the specific pattern is "0" and the background surrounding the specific pattern is "1".

The invention offers many advantages, such as high stability for long periods of time under gain conditions and variations in DC image signal levels related to slow speed due to inconsistencies in temperature and brightness for any given circumstances.

While only one application of the present invention has been shown and described, this fundamental concept may be modified to meet specific demands. The possible modifications are to be encompassed within the spirit and scope of the appended claims.

What is claimed is:

1. An analog-digital converter for use with image pick-up means producing analog signals representative of a two-dimensional pattern of an object which is sequentially scanned, comprising:

comparator means connected to said image pick-up means for converting said analog signals into binary signals on the basis of an applied threshold signal, sampling means for generating a first signal corresponding to the average value of a portion of said analog signal corresponding to a first pattern of selected size and shape scanned over said object and at least two second signals corresponding to the average value of respective portions of said analog signal corresponding to a pair of second patterns positioned adjacent said first pattern in predetermined relationship and scanned therewith over said object, first calculator means for detecting the maximum difference value between average levels of said first and second signals, second calculator means for detecting the minimum average level of said second signals, first gating means connected to said sampling means and said first and second calculator means for gating the average level of said first signal and the minimum average level of said second signals in response to the output of said first calculator means, third calculator means connected to said first gating means for generating said threshold signal based on the average value of said first signal and said minimum average level of said second signals, and second gating means for gating said threshold signal to said comparator means.

2. An analog-digital converter according to claim 1 wherein said sampling means comprises memory means including a plurality of serially connected memory cells for storing sequentially received signals representing scanned elements of said two-dimensional object pattern and average value calculator means connected to selected memory cells for generating said first and second signals.

3. An analog-digital converter according to claim 2 wherein said memory means comprises a plurality of serially connected shift registers each made up of a plurality of said memory cells, said object including a geometric pattern corresponding to said first pattern in size and shape, and said memory cells corresponding to said first pattern and those corresponding to said second patterns being connected to said average value calculator means.

4. An analog-digital converter according to claim 1 wherein said sampling means generates four second signals corresponding to respective portions of said analog signal corresponding to four second patterns positioned on respective sides of said first pattern in predetermined relationship and each being approximately one-fourth the size of said first pattern.

5. An analog-digital converter according to claim 4 wherein said sampling means comprises memory means including a plurality of serially connected memory cells for storing sequentially received signals representing scanned elements of said two-dimensional object pattern and average value calculator means connected to selected memory cells for generating said first and second signals.

6. An analog-digital converter according to claim 5 wherein a first group of memory cells located to store a portion of said analog signal corresponding to said first pattern are connected to first means for summing and averaging the signals stored therein, and respective second groups of memory cells located to store portions of said analog signal corresponding to said second patterns are connected to respective second means for summing and averaging the signals stored in each group.

7. An analog-digital converter according to claim 6 wherein said sampling means generates four second signals corresponding to respective portions of said analog signal corresponding to four second patterns positioned on respective sides of said first pattern in predetermined relationship and each being approximately one-fourth the size of said first pattern.

8. An analog-digital converter according to claim 7 wherein said memory means comprises a plurality of serially connected shift registers, each made up of a plurality of said memory cells.

9. An analog-digital converter according to claim 1 wherein said first calculator means comprises first means for producing an output equal to the difference of the average value of said first signal and the sum of the average values of said second signals, and second means for providing an output when the output of said first means exceeds a previously detected maximum.

10. An analog-digital converter according to claim 9 wherein said second means comprises a comparator having the output of said first means applied to the plus input thereof, a register for storing the output of said comparator, and a gate responsive to the output of said first means for connecting the output of said comparator to said register, the output of said register being connected to the minus input of said comparator.

* * * * *